United States Patent
Drewes et al.

(10) Patent No.: US 9,638,887 B2
(45) Date of Patent: May 2, 2017

(54) SUPPORTING DEVICE FOR A CURVED MIRROR

(71) Applicants: Stephan Drewes, Mönchengladbach (DE); Thomas Großerüschkamp, Duisburg (DE); Erik Hilfrich, Düsseldorf (DE); Mark Hirt, Bochum (DE); Jens Liesner, Stadtlohn (DE); Lothar Patberg, Moers (DE); Roman Glass, Schwerte (DE)

(72) Inventors: Stephan Drewes, Mönchengladbach (DE); Thomas Großerüschkamp, Duisburg (DE); Erik Hilfrich, Düsseldorf (DE); Mark Hirt, Bochum (DE); Jens Liesner, Stadtlohn (DE); Lothar Patberg, Moers (DE); Roman Glass, Schwerte (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 258 days.

(21) Appl. No.: 13/863,872

(22) Filed: Apr. 16, 2013

(65) Prior Publication Data
US 2013/0229723 A1    Sep. 5, 2013

Related U.S. Application Data

(63) Continuation of application No. PCT/EP2011/067736, filed on Oct. 11, 2011.

(30) Foreign Application Priority Data

Oct. 20, 2010   (DE) .................. 10 2010 060 091

(51) Int. Cl.
*G02B 7/182* (2006.01)
*F24J 2/12* (2006.01)
(Continued)

(52) U.S. Cl.
CPC ................ *G02B 7/182* (2013.01); *F24J 2/12* (2013.01); *F24J 2/14* (2013.01); *F24J 2/5233* (2013.01);
(Continued)

(58) Field of Classification Search
CPC .......... G02B 5/10; G02B 7/183; G02B 7/182; Y02E 10/45; Y02E 10/47; F24J 2/12; F24J 2/14
(Continued)

(56) References Cited

U.S. PATENT DOCUMENTS 4,135,493 A * 1/1979 Kennedy ................... 126/577
4,139,270 A    2/1979 Dotson
(Continued)

FOREIGN PATENT DOCUMENTS

DE    2939203 A1    4/1980
DE    19801078 A1   7/1999
(Continued)

*Primary Examiner* — Ricky D Shafer
(74) *Attorney, Agent, or Firm* — Reinhart Boerner Van Deuren P.C.

(57) ABSTRACT

The invention relates to a support device for a curved mirror having support elements and a curved mirror. The objective of providing a support device for a curved mirror which is constructed in a particularly simple manner and which enables particularly low production costs is achieved by a support device in that the support device has at least one bent metal carrier profile-member, the bent carrier profile-member having in the longitudinal direction an at least similar curvature to the curved mirror and being substantially mirror-symmetrical in the longitudinal direction.

13 Claims, 6 Drawing Sheets

(51) Int. Cl.
   *F24J 2/14* (2006.01)
   *F24J 2/52* (2006.01)
   *G02B 5/10* (2006.01)
   *G02B 7/183* (2006.01)
   *F24J 2/54* (2006.01)

(52) U.S. Cl.
   CPC .............. *G02B 5/10* (2013.01); *G02B 7/183* (2013.01); *F24J 2/5403* (2013.01); *F24J 2002/522* (2013.01); *F24J 2002/5215* (2013.01); *F24J 2002/5224* (2013.01); *Y02E 10/45* (2013.01); *Y02E 10/47* (2013.01)

(58) Field of Classification Search
   USPC ........ 359/853, 867, 869, 871; 126/684, 690, 126/694, 696
   See application file for complete search history.

(56) References Cited

U.S. PATENT DOCUMENTS

| | | | | |
|---|---|---|---|---|
| 4,240,406 A | * | 12/1980 | Hutchison | 359/867 |
| 4,262,660 A | | 4/1981 | Ilich | |
| 4,263,893 A | | 4/1981 | Pavlak et al. | |
| 4,372,027 A | * | 2/1983 | Hutchison | 29/448 |
| 4,422,614 A | * | 12/1983 | Santos | 248/475.1 |
| 4,502,200 A | | 3/1985 | Anderson et al. | |
| 4,571,812 A | * | 2/1986 | Gee | 29/445 |
| 4,770,162 A | | 9/1988 | L'Esperance et al. | |
| 5,069,540 A | * | 12/1991 | Gonder | 359/853 |
| 5,964,216 A | * | 10/1999 | Hoffschmidt et al. | 126/696 |
| 6,035,850 A | * | 3/2000 | Deidewig et al. | 126/696 |
| 8,256,413 B2 | * | 9/2012 | Koetter et al. | 126/600 |
| 8,479,463 B2 | * | 7/2013 | Gee et al. | 52/222 |
| 8,627,815 B2 | * | 1/2014 | Vazquez Ingelmo et al. | 126/690 |
| 2006/0157050 A1 | | 7/2006 | Le Lievre | |
| 2008/0308094 A1 | | 12/2008 | Johnston | |
| 2011/0279918 A1 | * | 11/2011 | Almogy et al. | 359/872 |

FOREIGN PATENT DOCUMENTS

| | | |
|---|---|---|
| DE | 20120680 U1 | 5/2002 |
| DE | 102009047945 A1 | 4/2011 |
| EP | 1947403 A1 | 7/2008 |
| ES | 1070880 U | 11/2009 |

* cited by examiner

SUPPORTING DEVICE FOR A CURVED MIRROR

CROSS-REFERENCE TO RELATED PATENT APPLICATIONS

This patent application is a continuation of PCT/EP2011/067736, filed Oct. 11, 2011, which claims priority to German Application No. 102010060091.1, filed Oct. 20, 2010, the entire teachings and disclosure of which are incorporated herein by reference thereto.

FIELD OF THE INVENTION

The invention relates to a support device for a curved mirror having support elements and a curved mirror.

BACKGROUND OF THE INVENTION

In order to encourage the development of renewable energy sources, the central issue concerns not only questions to be addressed relating to increasing the energy yield, but also increasingly the reduction of the necessary investment costs. In solar-thermal installations having a plurality of mirrors, the usable mirror surface-area determines the achievable power output of a solar-thermal power station. Solar-thermal power stations are provided with flat mirrors, but also with curved mirrors, for example, with parabolic mirrors, or parabolic channeled mirrors. Owing to the large surfaces of the curved mirrors used, it is necessary to support them since the mirror contour must be complied with in a very precise manner in order to ensure a high energy yield. Furthermore, the mirrors must be tracked mechanically, for example, in accordance with the position of the sun. The tracking ability of the mirrors also requires adequate stability of the mirror surfaces. For this reason, appropriately curved mirrors are supported by means of a support device. European Patent Application EP 1 947 403 A1 discloses such a support device for a parabolic channeled mirror and a method for the production thereof. The complex structured support device for a parabolic channeled mirror comprises a welded pipe to which there are secured complex shaped, wedge-like arms which are produced from a wedge-like cutout of a flat plate by means of deep drawing. However, owing to the wedge-like shaping, the securing, for example, to a longitudinal carrier which is provided on the parabolic channeled mirror, is not possible in a simple and precise manner. Finally, it is also disadvantageous that the connection elements on the parabolic channeled mirror cannot be readily replaced since they are integrated in the support arm. The use of separate support elements is further difficult with the known support device of a parabolic channeled mirror.

SUMMARY OF THE INVENTION

Based on this, an object of the present invention is to provide a support device for a curved mirror which is constructed in a particularly simple manner and which enables particularly low production costs. In addition, a cost-effective curved mirror is intended to be provided.

The above-mentioned object is achieved in accordance with the first teaching of the present invention by a support device in that the support device has at least one bent carrier profile-member made of metal, wherein the bent carrier profile-member having in the longitudinal direction at least partially an at least similar curvature to the curved mirror and being substantially axially symmetrical, that is to say, mirror symmetrical, in the longitudinal direction.

Bent carrier profile-members are particularly flexurally rigid and can therefore absorb particularly high forces, without becoming greatly deformed. The conventionally provided, complex shaped, wedge-like support devices which are constructed, for example, in the manner of a framework may be replaced according to the invention by a simple carrier profile-member having the same rigidity. The carrier profile-member is also substantially simpler to produce than the previously used wedge-like support devices which require complex sets of tools. In addition to the reduced weight and material use, the substantially axially symmetrical construction of the carrier profile-member in the longitudinal direction allows it to be able to be produced using simple tools with a high degree of shaping precision. The term axially symmetrical construction is intended according to the invention to be understood to refer to a mirror-symmetry along the mirror axis S, as can be seen in FIG. 3. The support devices for curved mirrors are thereby substantially simplified and their production costs are lowered.

According to a first embodiment of the support device according to the invention, the carrier profile-member is constructed as an open carrier profile-member. U-shaped carrier profile-members are preferably used. The lateral members of the U-shaped carrier profile-member preferably form an angle of a maximum of 60° with respect to the surface normal of the curved mirror. The carrier profile-member thereby still has adequate rigidity and can absorb the forces of the curved mirror.

If the lateral members of the bent U-shaped carrier profile-member are orientated substantially perpendicularly relative to the surface normal of the curved mirror, a maximum rigidity of the U-shaped carrier profile-member can be provided with respect to forces transmitted by the curved mirror and optionally the material thickness and consequently the costs of the support device can be reduced. Alternatively, the carrier profile-member may also be constructed as a closed carrier profile-member. Even higher forces can thereby be absorbed with the same material thickness.

According to another embodiment of the support device according to the invention, the support device is constructed to support a parabolic mirror or a parabolic channeled mirror. Parabolic mirrors or parabolic channeled mirrors require a particularly large number of support devices with large surface-areas, in order to ensure the precise parabolic contour and consequently the function thereof. With the support device according to the invention, these mirrors can be stabilised or supported in a particularly simple and cost-effective manner.

Flexible use and improved assembly are ensured by the next embodiment of the support device in that the bent carrier profile-member is formed by means of two or more bent metal carrier profile-member portions which are connected to each other in the longitudinal direction. Owing to the division of the carrier profile-member into two or more carrier profile-member portions, the production costs can be further reduced by the use of simple and smaller tools when, for example, two substantially identical carrier profile-member portions which are arranged in a mirror-symmetrical manner together form the entire carrier profile-member. The use of a plurality of carrier profile-member portions also allows a configuration which is optimised for loading by the use of different metal sheet thicknesses and/or materials for each section. The carrier profile-member portions can be transported in a simpler manner owing to their smaller dimensions.

According to another embodiment of the support device according to the invention, the production costs for the support device are minimised by the bent carrier profile-member and/or the bent carrier profile-member portions being a deep-drawn component or a rolled profile-member and optionally having flanges. Deep-drawing of U-shaped carrier profile-members or U-shaped carrier profile-member portions can be carried out with great precision in a simple manner, with few process steps and low cycle times. Furthermore, however, other production methods are also available, for example, rolling profiling, in order to provide the bent carrier profile-member or the carrier profile-member portions. In particular rolling profiling enables the production of large quantities of identical carrier profile-members with a constant cross-section. In contrast, when the U-shaped carrier profile-members are deep-drawn, specific, load-compatible shape or cross-section changes, for example, for forming connection locations owing to the higher degrees of geometrical freedom, can readily be taken into account.

A further improved support device may be provided in that the cross-section of the carrier profile-member or the carrier profile-member portions varies in the longitudinal direction. Via cross-section changes of the carrier profile-member, it is in particular possible to take into account differing rigidity requirements in the longitudinal direction of the carrier profile-member.

A particularly flexible connection of the support device according to the invention to a curved mirror is achieved by the support elements being provided as separate components in or on the carrier profile-member. In addition, the support elements for the curved mirror may also be integrated cumulatively or alternatively in the carrier profile-member so that the costs for the production of support elements can be saved.

In a particularly simple manner, the support elements may be provided by the support elements for the curved mirror being formed by flanges of the U-shaped carrier profile-member. The flanges may, for example, be additionally shaped or stamped.

If the rigidity of the carrier profile-member or the carrier profile-member portions used is not sufficient, according to another embodiment of the support device there are provided two additional auxiliary struts for supporting the bent carrier profile-member or the carrier profile-member portions, the additional auxiliary struts being arranged at the side of the bent carrier profile-member, or bent carrier profile-member portions, respectively, remote from the curved mirror to be supported. The auxiliary struts are preferably constructed as U-shaped profile-members and extend, as long as linearly extending auxiliary struts are used, preferably tangentially from the carrier profile-member edge to the centre of the carrier profile-member. Preferably, both auxiliary struts are connected to each other, for example screwed, at their intersection location. Together with the carrier profile-member, the linearly extending auxiliary struts form an arrangement which is similar to a triangle and which significantly increases the rigidity of the support device.

Particularly simple receiving of the mirror on the carrier profile-members can be provided according to another embodiment of the support device according to the invention in that support elements for the curved mirror are formed by one or more at least partially flat, L-shaped, Z-shaped, U-shaped sheet metal portions or a deep-drawn component having welding or pressing-in pins, wherein the support elements optionally being produced from steel. The U-shaped carrier profile-members with or without a flange are particularly suitable as simple support elements, which can be produced in a high-precision manner so that a very precise orientation of the support elements in the bent U-shaped carrier profile-member is enabled. This is also ensured by means of the use of a deep-drawn component having welding or pressing-in pins, the pressing-in pin being able to be orientated accordingly. Optionally, the support elements are produced from steel. On the one hand, steel has the necessary strength to receive the corresponding forces and, on the other hand, steel can be shaped to form the corresponding support elements in a very precise manner. The support elements may selectively have different levels of rigidity. Owing to the arrangement of support elements with high levels of rigidity in the direction of the mirror edge, and internal support elements which have a lower level of rigidity, deformations caused by the weight of the components can be counteracted and the degree of efficiency can thereby be improved. Furthermore, the support elements may be arranged in a substantially axially symmetrical manner, that is to say, mirror-symmetrical manner, which leads to a symmetrical loading in the support structure and torsion of the carrier profile-member can thereby substantially be prevented. Furthermore, the support elements may be arranged parallel with the direction of the surface normal of the mirror or selectively thereon in such a manner that the support elements are orientated parallel with each other in the same direction when the carrier profile-member is in the mounted state, whereby the assembly of the mirror can be facilitated. Other metals may be aluminum and magnesium.

According to another embodiment of the support device according to the invention, the carrier profile-members and/or carrier profile-member portions and optionally the auxiliary struts are produced from optionally pre-coated steel sheets which have a thickness of from 0.5 mm to 7.0 mm, preferably from 0.5 to 3.0 mm. Steel sheets having these thicknesses ensure that the bent profile-members of the support device have adequate strength and at the same time can be readily shaped. Furthermore, when pre-coated steel sheets which are coated, for example, organically or inorganically, are used, a good level of corrosion resistance is already reached so that a subsequent galvanisation of components is not required. Metals such as Zn—, Mg—, Al—, Ni—, Cr—, Fe—Cu—, Si—, and the alloys thereof are suitable as an inorganic coating, individually or in combination, from the melt or applied in an electrolytic manner. In the case of organic coating, corrosion protection primers and/or finishing paints are preferably applied after appropriate preparation of the surfaces.

In a simple manner, however, the corrosion protection of the support device may be further increased by the carrier profile-members and/or the carrier profile-member portions, also optionally the auxiliary struts, being subjected to a cathode immersion lacquering operation. With a cathode immersion lacquering operation, high batch numbers of carrier profile-members and/or carrier profile-member portions can be processed at low cost.

In principle, the use of other methods for applying corrosion coatings is also conceivable, for example, hot-dip galvanisation of individual components or subassemblies, zinc lamella coating or spray galvanisation.

According to a second teaching of the present invention, the object set out above for a curved mirror for a solar power station is achieved with a plurality of support devices according to the invention. Solar power stations often have a plurality of curved mirrors so that the substantially more cost-effective support device which can additionally be produced in a very precise manner contributes to a reduction of the investment costs.

This applies in particular as long as the mirror is a parabolic channeled mirror of a parabolic channeled power station, and a plurality of support devices according to the invention are arranged along the longitudinal axis of the parabolic channeled mirror.

BRIEF DESCRIPTION OF THE DRAWINGS

The invention will now be explained in greater detail with reference to embodiments together with the drawings, in which.

DETAILED DESCRIPTION OF THE INVENTION

Figure 1A:
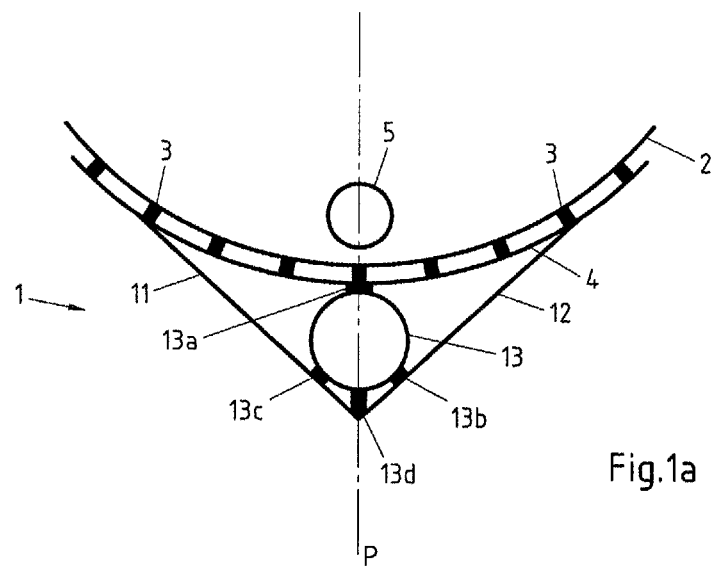
FIG. 1a), b) are schematic sectioned views perpendicularly relative to the longitudinal axis of a parabolic channeled mirror of two embodiments of a support device with differently depicted carrier profile-members, FIG. 2a), b) are schematic perspective views of two embodiments of a parabolic channeled mirror with a support device with and without additional support profile-members.
Figure 1B:
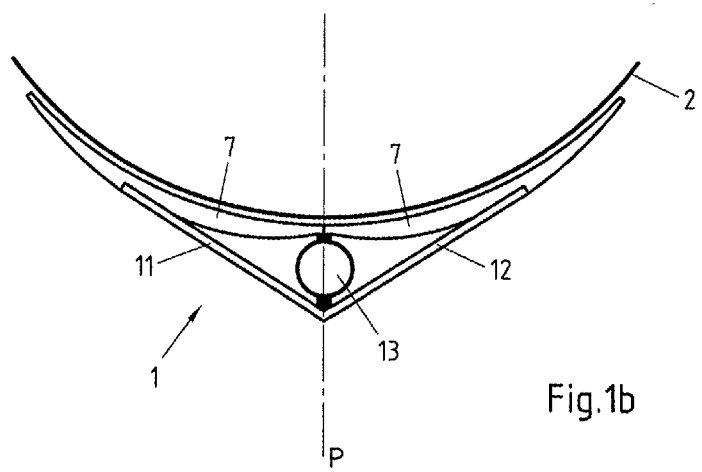

First, FIG. 1a) is a sectioned view of an embodiment of a support device 1 according to the invention of a curved mirror 2, which is constructed in this instance as a parabolic channeled mirror. The support device 1 additionally has support elements 3 which are in contact with the curved mirror 2 and support it. The support elements 3 are arranged on a U-shaped carrier profile-member 4 which is schematically illustrated in FIG. 1. The support elements 3 may be provided directly by the U-shaped carrier profile-member 4 or by separate support elements 3. There is arranged in the centre of the parabolic channeled mirror 2 an absorber pipe 5, on which the incident rays of the sun are focused and in which a medium to be heated flows. Furthermore, both FIG. 1a) and FIG. 1b) show a mirror axis P which indicates the mirror-symmetrical structure of the support device 1 extending in the longitudinal direction of the parabolic channeled mirror. Owing to the structure which is axially or mirror-symmetrical in the longitudinal direction of the carrier profile-members 4 or the carrier profile-member portions 7, identical carrier profile-member portions 7 can be used on both sides of the mirror axis P of the parabolic channeled mirror 2 so that the production costs can be lowered.

The embodiment of a support device 1 further has two additional auxiliary struts 11, 12 which may be formed, for example, from U-shaped profile-members which are connected, on the one hand, to the U-shaped carrier profile-member 4 and, on the other hand, to a central carrier 13 by means of optional receiving supports 13b, 13c, and 13d. In addition, the auxiliary struts 11, 12 may also be connected to each other, for example, by means of screws or other connection means. Other materially integral, non-positive-locking and/or positive-locking connection techniques are also conceivable, such as, for example, soldering, welding, riveting, adhesive-bonding. In contrast to the previously used support devices for parabolic channeled mirrors, the embodiment is distinguished by a load-optimised construction having a high level of shapeability and low production tolerances since, in addition to the auxiliary profile-members 11, 12, only a simple bent U-shaped carrier profile-member 4 is required.

As can be seen in FIG. 1a, the U-shaped carrier profile-member 4 has a similar curvature to the curved parabolic channeled mirror 2. This serves to be able to support the parabolic channeled mirror in a simple manner by means of support elements 3. The central carrier 13 which is connected to the respective U-shaped carrier profile-member 4 or the auxiliary struts 11, 12 by means of optional receiving supports 13a, 13b additionally supports the parabolic channeled mirror 2 in the longitudinal direction and is rotatably supported in order to align the mirrors in FIG. 1a so as to follow the position of the sun. The support device 1 provides support of the parabolic channeled mirror 2 in a radial plane which can be produced in a particularly simple manner. Owing to the high number of support devices 1 required with parabolic channeled mirrors, the simplification of the support device 1 according to the invention constitutes a significant cost advantage with respect to conventional support devices.

FIG. 1b) substantially corresponds to the embodiment in FIG. 1a), but with the difference that the carrier profile-member comprises two carrier profile-member portions 7 which are constructed as deep-drawn components and which have a load-optimised cross-section in the longitudinal direction. The flanges of the U-shaped carrier profile-member act as support elements and can be used for direct mirror securing operations, for example, by means of thick layer adhesive, with relatively small tolerances of the U-shaped carrier profile-member thereby being able to be compensated for, FIG. 1b. This embodiment reduces the oscillations caused by wind load and adjustment of the mirror and thereby increases the optical precision.

Figure 2A:
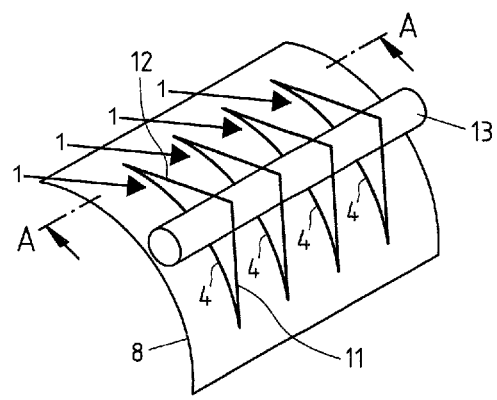

FIGS. 2a) and 2b) are perspective views of two embodiments of a parabolic channeled mirror 8 having a plurality of support devices according to the invention. In FIG. 2a), bent U-shaped carrier profile-members 4 are in contact with the mirror 8 by means of support elements not illustrated in FIG. 2a). The central carrier 13 which is arranged thereon supports the parabolic channeled mirror 2 in the longitudinal direction. The additional auxiliary struts 11 and 12 provided are screwed to each other at the opposing end faces thereof and are connected to the central carrier 13 in a materially integral, positive-locking and/or non-positive-locking manner. Furthermore, the auxiliary struts 11, 12 are connected to the bent U-shaped carrier profile-members 4 in a materially integral, positive-locking or non-positive-locking manner. With a structure which is still nonetheless very simple, this provides particularly rigid support in the radial plane of the parabolic channeled mirror 2. The central carrier 13 then ensures required torsional rigidity in the longitudinal direction of the parabolic channeled mirror 8.

Figure 2B:
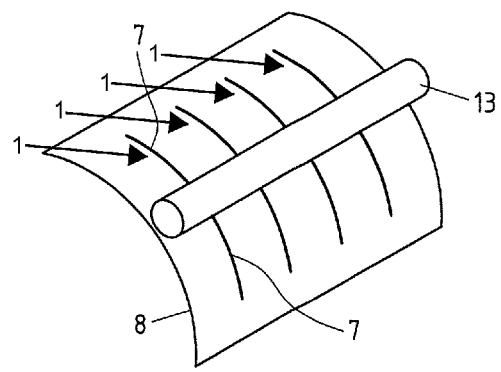

In FIG. 2b), the embodiment from FIG. 2a) is illustrated, but without additional auxiliary struts 11, 12 and instead with bent carrier profile-member portions 7, which are arranged below the central carrier 13 on the curved parabolic channeled mirror. FIG. 2b) constitutes a further simplified support of a parabolic channeled mirror 8.

Figure 3:
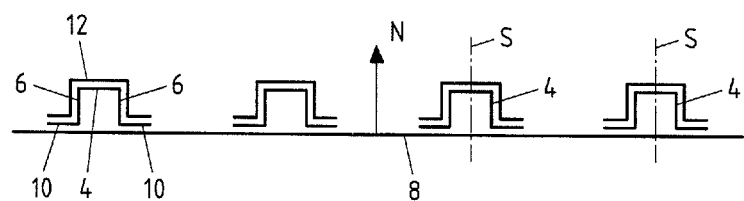
FIG. 3 shows the embodiment from FIG. 2a as section A.

FIG. 3 illustrates the embodiment from FIG. 2a) as section A. It can be seen that the lateral members 6 of the U-shaped carrier profile-member 4 extend almost parallel with the surface normal N of the mirror surface of the parabolic channeled mirror 8. This results in the bent U-shaped carrier profile-member 4 being able to counteract forces in the radial plane of the parabolic channeled mirror 8 with maximum rigidity. In addition, there are indicated the mirror axes or mirror planes S of the carrier profile-members which extend in the longitudinal direction and which indicate the axially or mirror-symmetrical structure of the carrier profile-members 4 in the longitudinal direction.

Figure 4A:
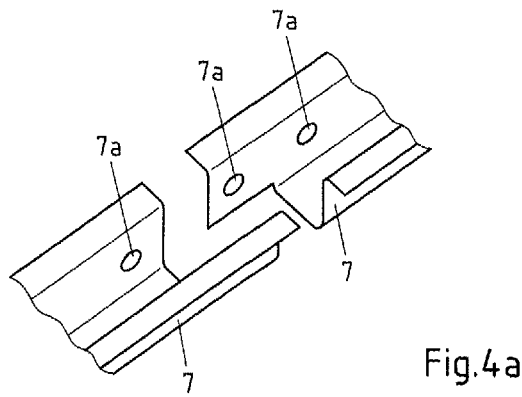
FIG. 4a is a schematic, perspective view of two U-shaped carrier profile-member portions before being connected to each other, FIG. 4b) is a schematic, perspective view of two U-shaped carrier profile-member portions in the assembled state according to FIG. 1b), and FIG. 5a) to h) are schematic sectioned and partially perspective views of embodiments of support elements.

FIG. 4a is a perspective illustration of a possibility for connecting two carrier profile-member portions 7 to form a carrier profile-member. The carrier profile-member portions 7 may, for example, be connected to each other by means of screwing elements using holes 7a. However, other connection types of the carrier profile-member portions 7 are also conceivable, for example, by means of screwing, soldering, welding, adhesive-bonding or by means of other materially integral, positive-locking or non-positive-locking connections.

Figure 4B:
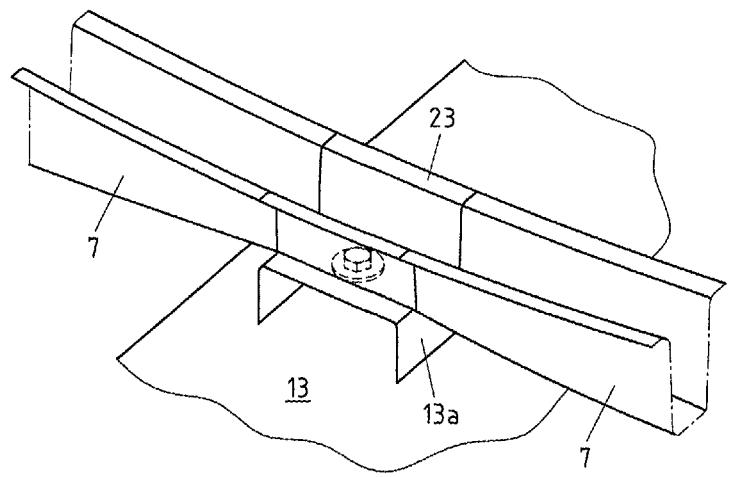

FIG. 4b shows the assembly state of a preferred embodiment of a support device according to the invention. The carrier profile-member portions 7 may be connected to each other directly or preferably be connected to each other by means of an intermediate piece 23 which is screwed to the central carrier 13 by means of the receiving support 13a.

FIG. 5 is both a sectioned and partially perspective view of different embodiments of the support elements 3. FIG. 5a) shows a support element 3 which comprises two L-shaped sheet metal portions 14, but which may also be produced in a T-shaped manner from a punched bent component which is not illustrated and which can be secured in a simple manner to the flanges 10 of the U-shaped carrier profile-member 4. In order to increase the rigidity, an additional flat sheet metal portion (not illustrated) may be arranged between the sheet metal portions 14 and the flanges 10 of the U-shaped carrier profile-member 4. If the support element 3 is provided by two Z-shaped sheet metal portions 15, the lateral members 6 of the U-shaped carrier profile-member 4 can be used to secure the support element 3, as illustrated by way of example in FIG. 5b).

Figure 5A:
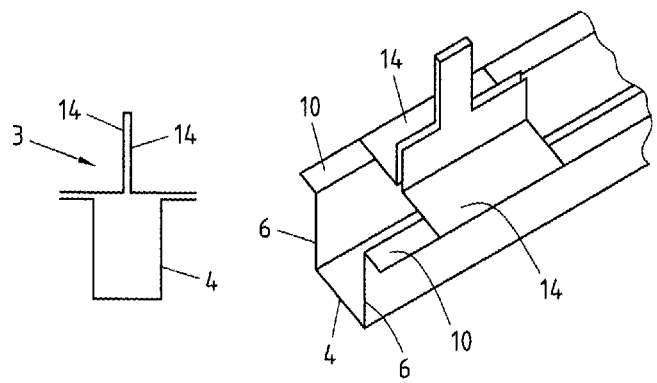
Figure 5B:
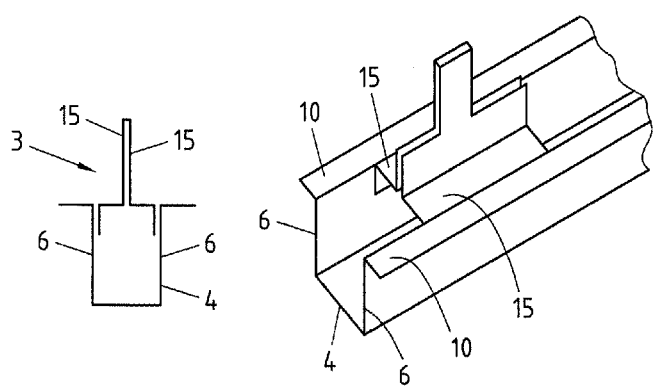
Figure 5C:
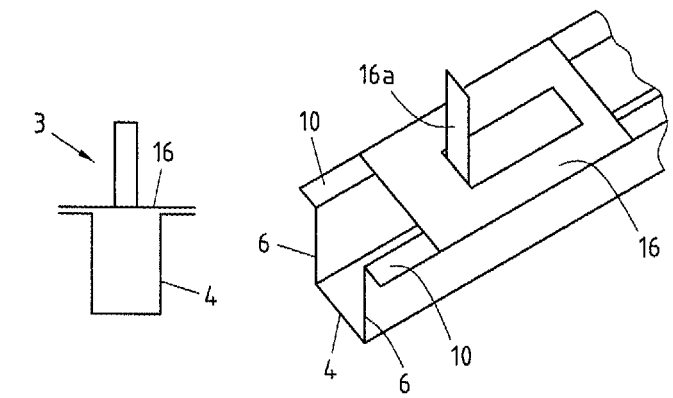

A particularly simple support element 3 can be provided by a flap 16a being cut from a flat sheet metal portion 16 and being bent upwards, FIG. 5c). The metal sheet is then connected to the flanges 10 of the U-shaped carrier profile-member 4 in a materially integral, positive-locking or non-positive-locking manner. The flap 16a which protrudes outwards is in contact with the curved mirror.

Figure 5D:
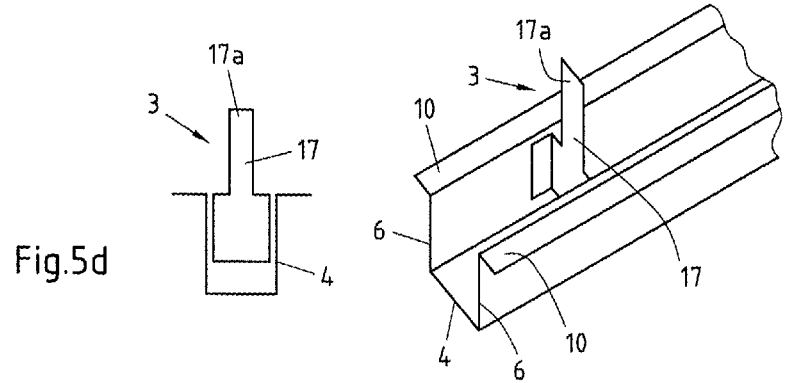

Another simple variant of the support element 3 is shown in FIG. 5d). The support element 3 is constructed in this instance as a partially U-shaped sheet metal portion 17, which has a protruding region 17a which in turn is in contact with the curved mirror. The U-shaped region of the sheet metal portion 17 can be used in a simple manner to arrange the sheet metal portion 17 in the U-shaped carrier profile-member 4 in a precise manner. Furthermore, there is also a large connection surface-area for materially integral, positive-locking or non-positive-locking connection of the sheet metal portion 17 to the U-shaped profile-member at the lateral member 6 thereof.

Figure 5E:
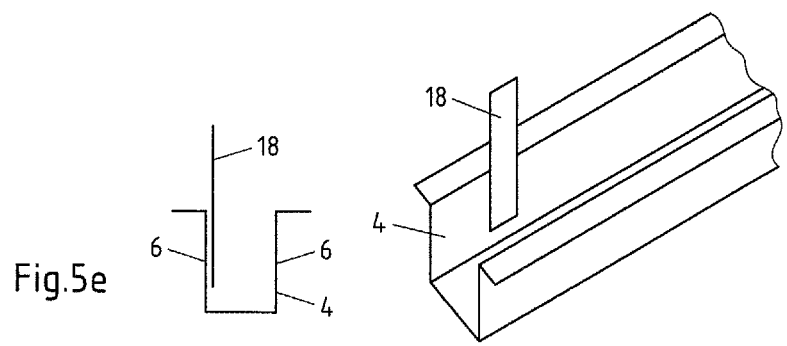

The simplest variant for support elements is shown in FIG. 5e). The support element 3 is simply a flat metal sheet 18 which is secured to one of the lateral members 6 of the U-shaped carrier profile-member 4 and protrudes therefrom so that the metal sheet 18 is in contact with the curved mirror.

Figure 5F:
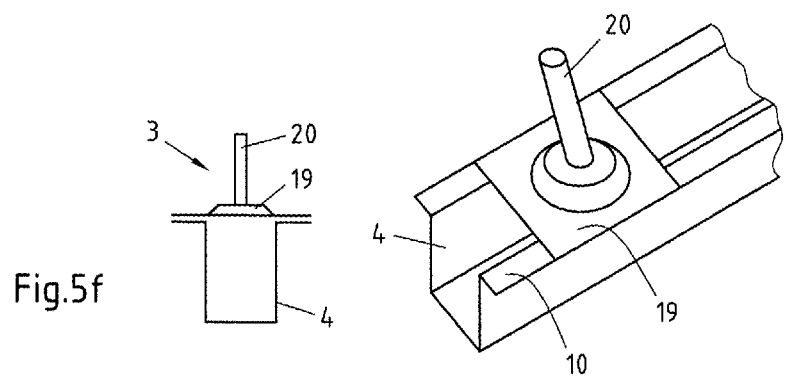

FIG. 5f) is both a cross-section and a perspective view of a support element 3 which is produced from a deep-drawn component 19 and a welding or pressing-in pin 20. The advantage of the welding or pressing-in pin 20 is that, owing to its arrangement in the deep-drawn component 19, for example, by means of an "inclined" arrangement, it can reach specific support points of the curved mirror 2 and ensures adequate support. The forces are further directed very well into the deep-drawn component 19 via the welding or pressing-in pin 20, even with an inclined arrangement, and transmitted from there to the U-shaped carrier profile-member 4. To this end, the deep-drawn component 19 has a deep-drawn recess in which the welding or pressing-in pin 20 is arranged.

Figure 5G:
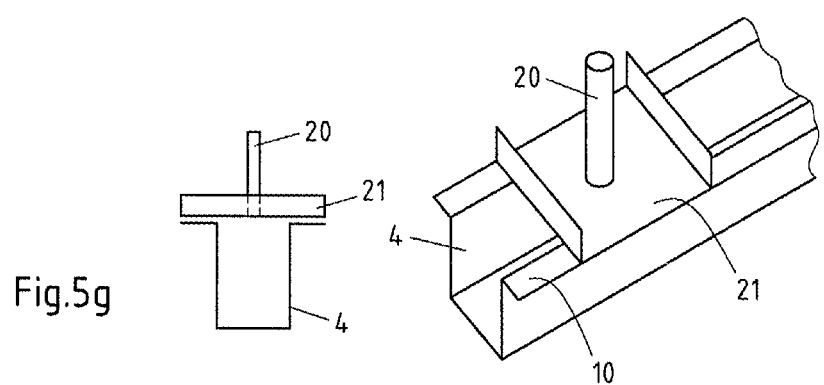

Another variant is illustrated in FIG. 5g). This substantially corresponds to the embodiment in FIG. 5f), but with the difference that the edges 21 of the deep-drawn component 19, which are not completely connected to the flange 10 of the U-shaped carrier profile-member 4, are bent through 90°, whereby the rigidity of the support element can be further increased again.

Figure 5H:
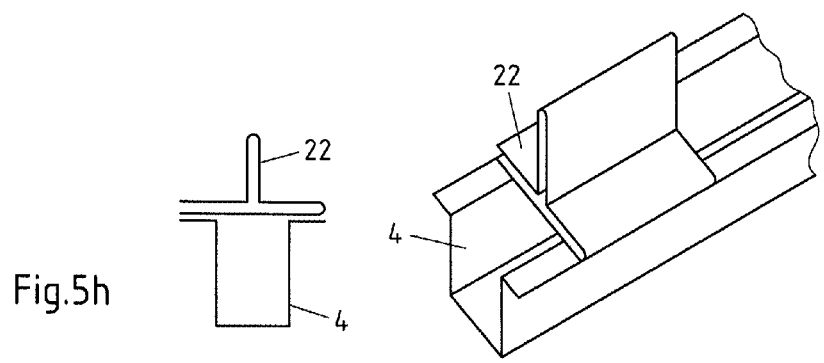

FIG. 5h) shows another example of a punched bent component 22, which contributes to increasing the rigidity of the U-shaped carrier profile-member 4.

In order to provide the simplest and most cost-effective solution possible for required reinforced variants in the event of locally increased wind loads, metal inserts may be integrated in the carrier profile-members, which are connected beforehand or afterwards, locally to the carrier profile-member, for example as a patch.

In addition to the cross-section optimisation, it is also possible to use load-optimised semifinished products in the form of tailored products (tailored blanks/tailored strips), for example, for the carrier profile-members and for the auxiliary struts.

The invention claimed is:

1. Support device for a curved mirror, the support device comprising at least one bent carrier profile-member of metal, the bent carrier profile-member having in a longitudinal direction at least partially an at least similar curvature to the curved mirror and being substantially mirror-symmetrical in the longitudinal direction, wherein the at least one bent carrier profile-member is constructed as an open U-shaped carrier profile-member comprising support-elements for the curved mirror and wherein said support-elements for the curved mirror are formed by flanges of the U-shaped carrier profile-member, and wherein the at least one bent carrier profile-member is formed by means of two or more bent metal carrier profile-member portions which are connected to each other in the longitudinal direction.

2. Support device according to claim 1, wherein lateral members of the bent U-shaped carrier profile-member form an angle of a maximum of 60° with respect to a surface normal of the curved mirror.

3. Support device according to claim 1, wherein lateral members of the bent U-shaped carrier profile-member are orientated substantially parallel with a surface normal of the curved mirror.

4. Support device according to claim 1, wherein the support device is constructed to support a parabolic mirror or a parabolic channeled mirror.

5. Support device according to claim 1, wherein the bent carrier profile-member portions are deep-drawn components or a rolled profile-member comprising flanges.

6. Support device according to claim 1, wherein a cross-section of the at least one bent carrier profile-member varies in the longitudinal direction.

7. Support device according to claim 1, wherein the support elements for the curved mirror are provided as separate components.

8. Support device according to claim 1, wherein two additional auxiliary struts for supporting the at least one bent carrier profile-member are provided, and the additional auxiliary struts are arranged at a side of the at least one bent carrier profile-member remote from the curved mirror to be supported.

9. Support device according to claim 1, wherein the support elements for the curved mirror are provided by one or more at least partially flat, L-shaped, Z-shaped, U-shaped sheet metal portions or a deep-drawn component having welding or pressing-in pins, arranged on the U-shaped carrier profile-member.

10. Support device according to claim 1, wherein the at least one bent carrier profile-member and auxiliary struts for supporting the at least one bent carrier profile-member are produced from pre-coated steel sheets which have a thickness of from 0.5 mm to 7.0 mm.

11. Support device according to claim 1, wherein the at least one bent carrier profile-member and auxiliary struts for supporting the at least one bend carrier profile-member have been subjected to a cathode immersion lacquering operation.

12. Curved mirror for a solar power station having a plurality of support devices according to claim 1.

13. Curved mirror according to claim 12, wherein the mirror for a solar power station is a parabolic channeled mirror of a parabolic channeled solar power station and the plurality of support devices according to claim 1 are arranged along a longitudinal axis of the parabolic channeled mirror.

* * * * *

UNITED STATES PATENT AND TRADEMARK OFFICE
CERTIFICATE OF CORRECTION

PATENT NO. : 9,638,887 B2  
APPLICATION NO. : 13/863872  
DATED : May 2, 2017  
INVENTOR(S) : Stephan Drewes et al.

Page 1 of 1

It is certified that error appears in the above-identified patent and that said Letters Patent is hereby corrected as shown below:

In the Claims

Claim 4, Line 3, delete "channeled" and replace with --channelled--

Claim 13, Line 2, delete "channeled" and replace with --channelled--

Claim 13, Line 3, delete "channeled" and replace with --channelled--

Claim 13, Line 6, delete "neled" and replace with --nelled--

Signed and Sealed this
First Day of August, 2017

Joseph Matal
*Performing the Functions and Duties of the*
*Under Secretary of Commerce for Intellectual Property and*
*Director of the United States Patent and Trademark Office*